United States Patent
Gao et al.

(10) Patent No.: US 11,632,282 B2
(45) Date of Patent: Apr. 18, 2023

(54) SYNCHRONIZATION METHOD AND DEVICE, SYNCHRONIZATION SYSTEM, AND COMPUTER-READABLE STORAGE MEDIUM

(71) Applicant: SANECHIPS TECHNOLOGY CO., LTD., Shenzhen (CN)

(72) Inventors: Zhuhong Gao, Shenzhen (CN); Wenping Fang, Shenzhen (CN); Longhui Tang, Shenzhen (CN); Guolong Peng, Shenzhen (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 17 days.

(21) Appl. No.: 17/312,715

(22) PCT Filed: Dec. 16, 2019

(86) PCT No.: PCT/CN2019/125576
§ 371 (c)(1),
(2) Date: Jun. 10, 2021

(87) PCT Pub. No.: WO2020/119820
PCT Pub. Date: Jun. 18, 2020

(65) Prior Publication Data
US 2022/0021571 A1  Jan. 20, 2022

(30) Foreign Application Priority Data
Dec. 14, 2018 (CN) ................ 201811534117.2

(51) Int. Cl.
*H04L 27/26* (2006.01)
*H04B 7/185* (2006.01)
*H04W 56/00* (2009.01)

(52) U.S. Cl.
CPC ..... *H04L 27/2656* (2013.01); *H04B 7/18504* (2013.01); *H04L 27/261* (2013.01); *H04L 27/2657* (2013.01); *H04W 56/0035* (2013.01)

(58) Field of Classification Search
CPC ............. H04L 27/2656; H04L 27/261; H04L 27/2657; H04L 5/0048; H04L 2027/0026;
(Continued)

(56) References Cited

U.S. PATENT DOCUMENTS 9,451,569 B1  10/2016 Xiao
2007/0252029 A1* 11/2007 Karem ................. G05D 1/00
244/1 R
(Continued)

FOREIGN PATENT DOCUMENTS

CN   102651884 A   8/2012
CN   105519064 A   4/2016
(Continued)

OTHER PUBLICATIONS

Alcatel-Lucent Bell, "Synchronization for D2D Communication", 3GPP TSG RAN WG1 Meeting #74bis, Guangzhou, China Oct. 7-11, 2013, R1-134228.
(Continued)

*Primary Examiner* — Ayaz R Sheikh
*Assistant Examiner* — Debebe A Asefa
(74) *Attorney, Agent, or Firm* — Cantor Colburn LLP (57) ABSTRACT

Provided is a synchronization method, which includes: a first device periodically sends a first PSS sequence and first PDSCH control information at frequency points $F_1$ to $F_N$ in sequence, where the first PSS sequence and the first PDSCH control information are used for a second device to detect the first PSS sequence and detect the first PDSCH control information; the first device receives signals at frequency points $f_1$ to $f_M$ in sequence and detects a second PSS sequence; when the second PSS sequence is detected, the first device obtains second half-frame synchronization information and detects second PDSCH control information according to the second half-frame synchronization information; and when the second PDSCH control information is detected, the first device obtains second frame synchronization information and enters a synchronization state. Also provided are a synchronization device, a synchronization system, and a computer-readable storage medium.

18 Claims, 4 Drawing Sheets

(58) Field of Classification Search
CPC ............ H04L 27/0014; H04B 7/18504; H04B 7/18506; H04W 56/0035; H04W 56/0015; H04W 56/001; H04J 3/0638; G08C 17/02
See application file for complete search history.

(56) References Cited

U.S. PATENT DOCUMENTS

| | | | | |
|---|---|---|---|---|
| 2018/0324770 | A1* | 11/2018 | Nogami | H04W 72/042 |
| 2020/0154376 | A1* | 5/2020 | Ko | H04W 72/005 |

FOREIGN PATENT DOCUMENTS

| | | |
|---|---|---|
| CN | 106470462 A | 3/2017 |
| EP | 3264665 A1 | 1/2018 |
| WO | 2018031644 A1 | 2/2018 |

OTHER PUBLICATIONS

Ericsson, "On Synchronization for NR Sidelink", 3GPP TSG-RAN WG1 Meeting #95, Spokane, WA, Nov. 12-16, 2018, R1-1813640.
European Search Report for corresponding application 19894752.7; Report dated Jan. 12, 2022.
LG Electronics, "Synchronization for D2D Communications", 3GPP TSG RAN WG1 Meeting #74, Barcelona Spain, Aug. 19-23, 2013, R1-133384.
Samsung, "Discussion on Synchronization Mechanisms for NR V2X", 3GPP TSG RAN WG1 Meeting #95, Spokane, USA, Nov. 12-16, 2018, R1-1812986.
International Search Report for corresponding application PCT/CN2019/125576 filed Dec. 16, 2019; dated Mar. 10, 2020.

* cited by examiner

SYNCHRONIZATION METHOD AND DEVICE, SYNCHRONIZATION SYSTEM, AND COMPUTER-READABLE STORAGE MEDIUM

CROSS-REFERENCE TO RELATED APPLICATION

The present disclosure claims priority to Chinese Patent Priority No. 201811534117.2, filed to the China National Intellectual Property Administration on Dec. 14, 2018, the disclosure of which is hereby incorporated by reference in its entirety.

TECHNICAL FIELD

The present disclosure relates to the technical field of communications, and for example, to a synchronization device, a synchronization system, and a computer-readable storage medium.

BACKGROUND

An Unmanned Aerial Vehicle (UAV) is an unmanned aircraft operated by a radio remote control device and a self-contained program control device. The UAV relates to the sensor technology, the communication technology, the information processing technology, the intelligent control technology, and the power propulsion technology, etc., and it is a product with high technical content in the information age.

The UAV synchronization process is a process that a remote controller and an aircraft realize time synchronization and frequency synchronization, where the time synchronization is that clock time values distributed in different places are adjusted to a certain accuracy or a certain coincidence degree through time comparison, and the frequency synchronization is that frequency values of frequency sources distributed in different places are adjusted to a certain accuracy or a certain coincidence degree through frequency comparison. The time synchronization is referred to as absolute time synchronization (also known as timing), and frequency synchronization is referred to as relative time synchronization.

A method for synchronizing a high-dynamic UAV data link is provided in the related art. In the method, cached data portions are correlated firstly, parallel Fast Fourier Transformation (FFT) is performed on a correlation result, and threshold judgment is performed on an output frequency spectrum value so as to estimate a Doppler frequency offset and a signal scale variation. The method has the problems that data processing is relatively complex, the requirements on the running frequency and the memory of a Central Processing Unit (CPU) of a terminal device are relatively high, the power consumption reduction of a terminal is not facilitated, the method is not suitable for engineering application, and in addition, the method is not suitable for strong interference and long-distance scenes.

A self-synchronization method of point-to-point communication of a UAV data link in a time division system is also provided in the related art. In the method, the self-synchronization process of point-to-point communication of the UAV data link in the time division system is completed by utilizing the characteristics of random jitter of an interruption delay of an MCS-51 single chip microcomputer (an integrated circuit chip). The method can solve the problems of high power consumption of a receiving and transmitting duplexer of a UAV frequency division multiplexing system, unfavorable light design, etc., but the MCS-51 single chip microcomputer adopted by the method cannot adapt to a strong interference scene, is not suitable for long-distance synchronization, etc.

SUMMARY

The embodiments of the present disclosure provide a synchronization method and device, a synchronization system, and a computer-readable storage medium, which can realize anti-interference fast synchronization.

The embodiments of the present disclosure provide a synchronization method, which includes the following steps: a first device periodically sends a first Primary Synchronization Signal (PSS) sequence and first Physical Downlink Shared Channel (PDSCH) control information at frequency points $F_1$ to $F_N$ in sequence, where the first PSS sequence and the first PDSCH control information are used for a second device to detect the first PSS sequence and detect the first PDSCH control information, the frequency points $F_1$ to $F_N$ are N different frequency points, and N is a natural number greater than or equal to 1;
the first device receives signals at frequency points $f_1$ to $f_M$ in sequence, and detects a second PSS sequence, where the frequency points $f_1$ to $f_M$ are M different frequency points, and M is a natural number greater than or equal to 1;
when the second PSS sequence is detected, the first device obtains second half-frame synchronization information, and detects the second PDSCH control information according to the obtained second half-frame synchronization information; and
when the second PDSCH control information is detected, the first device obtains second frame synchronization information, and enters a synchronization state.

The embodiments of the present disclosure also provide a computer-readable storage medium, which stores one or more programs, where the one or more programs are executable by one or more processors to implement the method as described in any one of the above.

The embodiments of the present disclosure also provide a first device, which includes a processor and a memory, where the processor is configured to execute a program stored in the memory to implement the method as described in any one of the above.

The embodiments of the present disclosure also provide a synchronization method, which includes the following steps: a second device receives signals at frequency points $F_1$ to $F_N$ in sequence, and detects a first PSS sequence, where the frequency points $F_1$ to $F_N$ are N different frequency points, and N is a natural number greater than or equal to 1;
when the first PSS sequence is detected, the second device obtains first half-frame synchronization information, and detects the first PDSCH control information according to the obtained first half-frame synchronization information;
when the first PDSCH control information is detected, the second device obtains first frame synchronization information, and enters a pre-synchronization state;
the second device sends a second PSS sequence and second PDSCH control information at frequency points $f_1$ to $f_M$ in sequence, where the second PSS sequence and the second PDSCH control information are used for a first device to detect the second PSS sequence and detect the second PDSCH control information, the frequency points $f_1$ to $f_M$ are M different frequency points, and M is a natural number greater than or equal to 1; and after detecting that the first device enters a synchronization state, the second device enters a synchronization state.

The embodiments of the present disclosure also provide a computer-readable storage medium, which stores one or more programs, where the one or more programs are executable by one or more processors to implement the method as described in any one of the above.

The embodiments of the present disclosure also provide a second device, which includes a processor and a memory, where the processor is configured to execute a program stored in the memory to implement the method as described in any one of the above.

The embodiments of the present disclosure also provide a synchronization system, which includes a first device as described in any one of the above and a second device as described in any one of the above.

The embodiments of the present disclosure also provide a synchronization method, which includes the following steps:
a first device periodically sends a first PSS sequence and first PDSCH control information at frequency points $F_1$ to $F_N$ in sequence, where a frequency point conversion period of the frequency points $F_1$ to $F_N$ of the first device is $T_1$ ms, the frequency points $F_1$ to $F_N$ are N different frequency points, and N is a natural number greater than or equal to 1;
a second device receives signals at the frequency points $F_1$ to $F_N$ in sequence, and detects the first PSS sequence, where a frequency point conversion period of the frequency points $F_1$ to $F_N$ of the second device is $T_1/(2N)$ ms;
when the first PSS sequence is detected, the second device obtains first half-frame synchronization information, starts second Carrier Frequency Offset (CFO) detection to obtain a second CFO estimation value, and detects the first PDSCH control information according to the obtained first half-frame synchronization information and the second CFO estimation value;
when the first PDSCH control information is detected, the second device obtains first frame synchronization information, and enters a pre-synchronization state;
the second device sends a second PSS sequence and second PDSCH control information at frequency points $f_1$ to $f_M$ in sequence, where the frequency points $f_1$ to $f_M$ are M different frequency points, and M is a natural number greater than or equal to 1;
the first device receives signals at the frequency points $f_1$ to $f_M$ in sequence, and detects the second PSS sequence;
when the second PSS sequence is detected, the first device obtains second half-frame synchronization information, and detects the second PDSCH control information according to the obtained second half-frame synchronization information;
when the second PDSCH control information is detected, the first device obtains second frame synchronization information, and enters a synchronization state; and
after detecting that the first device enters a synchronization state, the second device enters a synchronization state.

The embodiments of the present disclosure also provide a synchronization method, which includes the following steps:
a first device periodically sends a first PSS sequence and first PDSCH control information at frequency points $F_1$ to $F_N$ in sequence, where a frequency point conversion period of the frequency points $F_1$ to $F_N$ of the first device is $T_1$ ms, the frequency points $F_1$ to $F_N$ are N different frequency points, and N is a natural number greater than or equal to 1;
a second device receives signals at the frequency points $F_1$ to $F_N$ in sequence, and detects the first PSS sequence, where a frequency point conversion period of the frequency points $F_1$ to $F_N$ of the second device is $T_1/(2N)$ ms;
when the first PSS sequence is detected, the second device obtains first half-frame synchronization information, and detects the first PDSCH control information according to the obtained first half-frame synchronization information;
when the first PDSCH control information is detected, the second device obtains first frame synchronization information, and enters a pre-synchronization state;
the second device sends a second PSS sequence and second PDSCH control information at frequency points $f_1$ to $f_M$ in sequence, where the frequency points $f_1$ to $f_M$ are M different frequency points, and M is a natural number greater than or equal to 1;
the first device receives signals at the frequency points $f_1$ to $f_M$ in sequence, and detects the second PSS sequence;
when the second PSS sequence is detected, the first device obtains second half-frame synchronization information, starts first CFO detection to obtain a first CFO estimation value, and detects the second PDSCH control information according to the obtained second half-frame synchronization information and the first CFO estimation value;
when the second PDSCH control information is detected, the first device obtains second frame synchronization information, and enters a synchronization state; and
after detecting that the first device enters a synchronization state, the second device enters a synchronization state.

DETAILED DESCRIPTION OF THE EMBODIMENTS

The embodiments of the present disclosure are described below in combination with the accompanying drawings. In the case of no conflict, the features in the embodiments and the embodiments in the present disclosure may be combined with each other.

In order to solve the problem of UAV synchronization, an aircraft and a remote controller are initialized into the same data link communication function parameters in the related art, synchronization is carried out according to a mode that synchronization head signals are mutually transmitted at fixed signal transmission period intervals, and both parties enter a synchronization locking state after receiving the synchronization head signals, and establish a data link. The synchronization methods in the related art do not support strong interference scenes and long-range synchronization.

Figure 1:
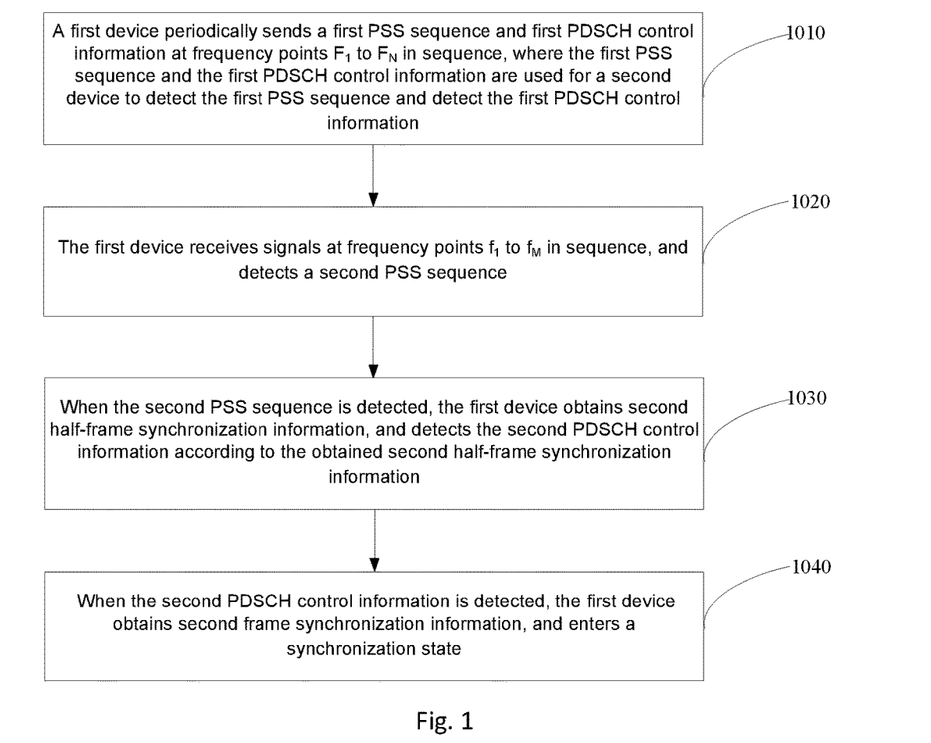
FIG. 1 is a schematic flowchart of a synchronization method of a first device according to an embodiment of the present disclosure.

As shown in FIG. 1, a synchronization method according to an embodiment of the present disclosure includes step 1010 to step 1040.

At step 1010, a first device periodically sends a first PSS sequence and first PDSCH control information at frequency points $F_1$ to $F_N$ in sequence, where the first PSS sequence and the first PDSCH control information are used for a second device to detect the first PSS sequence and detect the first PDSCH control information, the frequency points $F_1$ to $F_N$ are N different frequency points, and N is a natural number greater than or equal to 1.

In an embodiment of the present disclosure, the first device is a UAV and the second device is a remote controller; or the first device is a remote controller and the second device is a UAV.

In an embodiment of the present disclosure, adjacent frequency points among the frequency points $F_1$ to $F_N$ are uniformly spaced.

The first PDSCH control information carries information of the frequency points $f_1$ to $f_M$.

In an embodiment of the present disclosure, a frequency point conversion period of the frequency points $F_1$ to $F_N$ of the first device is $T_1$ ms, and a frequency point conversion period of the frequency points $F_1$ to $F_N$ of the second device is $T_1/(2N)$ ms.

Exemplarily, $T_1$ may be 2560 or 5120 ms, and N may be 4 or 8. For example, when $T_1$ is 5120 ms and N is 8, a frequency point conversion period of the frequency points $F_1$ to $F_N$ of the first device is 5120 ms, and a frequency point conversion period of the frequency points $F_1$ to $F_N$ of the second device is 320 ms.

In an embodiment of the present disclosure, the first device and the second device select frequency points $F_1$ to $F_N$ and a first PSS sequence according to an Unmanned Aerial Vehicle Identity (UAVID).

In an embodiment, in Long Term Evolution (LTE), there are only three PSS sequences, and only three correlation operations are required to determine which PSS sequence to detect. Three or multiple PSS sequences may be provided in the present disclosure. The UAV selects to use which first PSS sequence and second PSS sequence according to the UAVID of the UAV. The remote controller selects a corresponding first PSS sequence and second PSS sequence according to the UAVID of the paired UAV recorded by the remote controller. The first PSS sequence and the second PSS sequence are generally selected to be different to avoid interference with each other.

The second device receives signals at frequency points $F_1$ to $F_N$ in sequence, and detects a first PSS sequence (Slip correlation detection methods of the related art may be used herein). When the first PSS sequence is detected, the second device obtains first half-frame synchronization information, and detects the first PDSCH control information according to the obtained first half-frame synchronization information. When the first PDSCH control information is detected, the second device obtains first frame synchronization information, and enters a pre-synchronization state. The second device sends a second PSS sequence and second PDSCH control information at frequency points $f_1$ to $f_M$ in sequence, where the frequency points $f_1$ to $f_M$ are M different frequency points, and M is a natural number greater than or equal to 1.

At step 1020, the first device receives signals at frequency points $f_1$ to $f_M$ in sequence, and detects a second PSS sequence, where the frequency points $f_1$ to $f_M$ are M different frequency points, and M is a natural number greater than or equal to 1.

In an embodiment, since the second device has entered a pre-synchronization state at this moment, the frequency point conversion periods of the frequency points $f_1$ to $f_M$ of the first device and the second device may take as small a value as possible, for example, 5 ms, to shorten the synchronization time.

Here, the frequency points $f_1$ to $f_M$ may be the same as the frequency points $F_1$ to $F_N$, or may be different from the frequency points $F_1$ to $F_N$. In general, the UAV may receive less interference in the air, the remote controller may receive more interference on the ground, and the frequency interference can be better avoided by selecting different frequency points from the frequency points $f_1$ to $f_M$ and the frequency points $F_1$ to $F_N$.

At step 1030, when the second PSS sequence is detected, the first device obtains second half-frame synchronization information, and detects the second PDSCH control information according to the obtained second half-frame synchronization information.

In an embodiment of the present disclosure, before the second PDSCH control information is detected, the method further includes the following steps:

the first device starts first CFO detection to obtain a first CFO estimation value; and the first device detects the second PDSCH control information according to the obtained second half-frame synchronization information and the first CFO estimation value.

Figure 2:
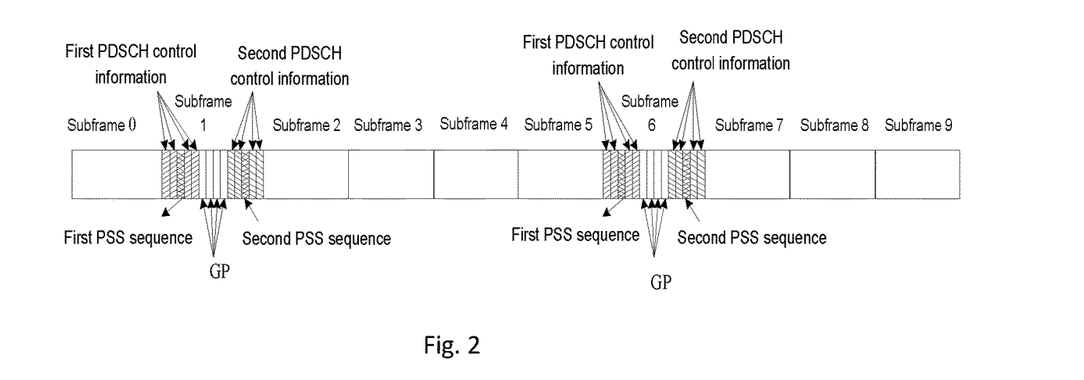
FIG. 2 is a schematic diagram of frame structures used by a first device and a second device according to an embodiment of the present disclosure.

The frame structures used by the first device and the second device in the present disclosure are shown in FIG. 2. A 10 ms frame is divided into two 5 ms half-frames, each half-frame is composed of four data sub-frames (D sub-frames) and one special sub-frame (S sub-frames). Each sub-frame is divided into two 0.5 ms slots, each of which is further divided into seven Orthogonal Frequency Division Multiplexing (OFDM) symbols. The special sub-frame is composed of three special slots with a total time length of 1 ms: a Downlink Pilot Time Slot (DwPTS), a Guard Interval (GP), and an Uplink Pilot Time Slot (UpPTS). The length of the three special slots supports nine configuration options. The length of the UpPTS is 1-2 symbols; the length of the DwPTS is 3-12 symbols; and the length of the corresponding GP is 1-10 symbols. The first PSS sequence sent by the first device is sent in the third symbol of sub-frame 1 and sub-frame 6 (i.e., DwPTS).

Since PSS signals of upper and lower half-frames of one sub-frame are the same, PSS detection can only realize a 5 ms half-frame synchronization function. The method for detecting PSS sequences by the first device and the second device in the present disclosure may be sliding correlation with a local sequence, and the position of a peak value is the position of a PSS.

At step 1040, when the second PDSCH control information is detected, the first device obtains second frame synchronization information, and enters a synchronization state.

In an embodiment of the present disclosure, the second frame synchronization information includes a second superframe number and a second sub-frame number, and the second PDSCH control information carries the second super-frame number and the second sub-frame number.

In an embodiment of the present disclosure, after entering the synchronization state, the method further includes that: the first device stops sending the first PSS sequence.

At this moment, after the second device detects that the first device enters a synchronization state, the second device also enters a synchronization state. In an embodiment, the second device may determine whether the first device has entered a synchronization state by detecting state information in the first PDSCH control information periodically sent by the first device. After both the first device and the second device enter a synchronization state, the first device and the second device still periodically send S sub-frames, but the first PSS sequence and the second PSS sequence therein are set to all 0 at this moment so as to avoid interference to other systems; or the first PDSCH control information and the second PDSCH control information are sent respectively at the sending positions (third symbols of the corresponding frame structures) of the first PSS sequence and the second PSS sequence, thereby not only avoiding interference to other systems, but also enhancing the transmission capability of PDSCH control information.

According to the synchronization method and device, the synchronization system, and the computer-readable storage medium provided by the embodiments of the present disclosure, a PSS sequence and PDSCH control information are periodically sent on one device, PSS detection and PDSCH control information detection are carried out on the other device, and the anti-interference fast synchronization between the two devices is effectively realized.

The embodiments of the present disclosure also provide a computer-readable storage medium, which stores one or more programs, where the one or more programs are executable by one or more processors to implement the method as described in any one of the above.

The embodiments of the present disclosure also provide a first device, which includes a processor and a memory, where the processor is configured to execute a program stored in the memory to implement the method as described in any one of the above.

Figure 3:
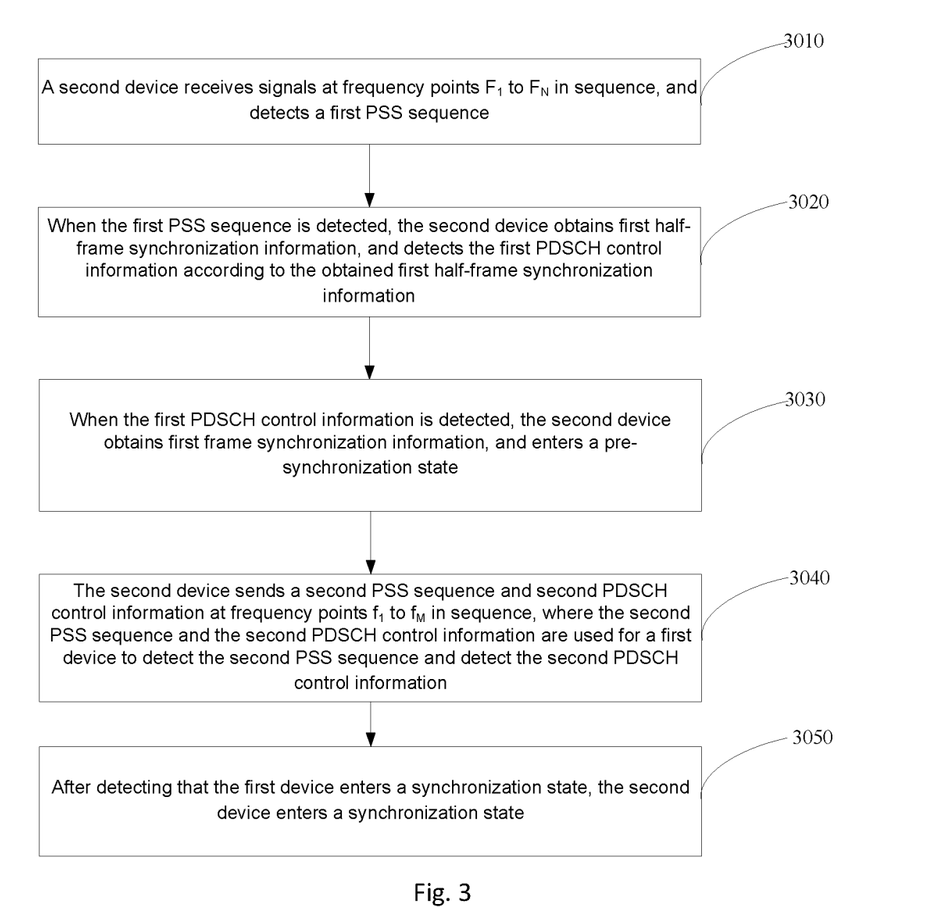
FIG. 3 is a schematic flowchart of a synchronization method of a second device according to an embodiment of the present disclosure.

As shown in FIG. 3, the embodiments of the present disclosure also provide a synchronization method, which includes step 3010 to step 3050.

At step 3010, a second device receives signals at frequency points $F_1$ to $F_N$ in sequence, and detects a first PSS sequence, where the frequency points $F_1$ to $F_N$ are N different frequency points, and N is a natural number greater than or equal to 1.

Before step 3010, the first device periodically sends the first PSS sequence and the first PDSCH control information in sequence at the frequency points $F_1$ to $F_N$.

In an embodiment of the present disclosure, the first device is a UAV and the second device is a remote controller; or the first device is a remote controller and the second device is a UAV.

In an embodiment of the present disclosure, adjacent frequency points among the frequency points $F_1$ to $F_N$ are uniformly spaced.

The first PDSCH control information carries information of the frequency points $f_1$ to $f_M$.

In an embodiment of the present disclosure, a frequency point conversion period of the frequency points $F_1$ to $F_N$ of the first device is $T_1$ ms, and a frequency point conversion period of the frequency points $F_1$ to $F_N$ of the second device is $T_1/(2N)$ ms.

For example, $T_1$ may be 2560 or 5120 ms, and N may be 4 or 8.

In an embodiment of the present disclosure, the first device and the second device select frequency points $F_1$ to $F_N$ and a first PSS sequence according to a UAVID.

At step 3020, when the first PSS sequence is detected, the second device obtains first half-frame synchronization information, and detects the first PDSCH control information according to the obtained first half-frame synchronization information.

In an embodiment of the present disclosure, before the first PDSCH control information is detected, the method further includes the following steps:
the second device starts second CFO detection to obtain a second CFO estimation value; and
the second device detects the first PDSCH control information according to the obtained first half-frame synchronization information and the second CFO estimation value.

At step 3030, when the first PDSCH control information is detected, the second device obtains first frame synchronization information, and enters a pre-synchronization state.

In an embodiment of the present disclosure, the first frame synchronization information includes a first super-frame number and a first sub-frame number, and the first PDSCH control information carries the first super-frame number and the first sub-frame number.

At step 3040, the second device sends a second PSS sequence and second PDSCH control information at frequency points $f_1$ to $f_M$ in sequence, where the second PSS sequence and the second PDSCH control information are used for a first device to detect the second PSS sequence and detect the second PDSCH control information, the frequency points $f_1$ to $f_M$ are M different frequency points, and M is a natural number greater than or equal to 1.

At this moment, the first device receives signals at frequency points $f_1$ to $f_M$ in sequence, and detects a second PSS sequence. When the second PSS sequence is detected, the first device obtains second half-frame synchronization information, and detects the second PDSCH control information according to the obtained second half-frame synchronization information.

When the second PDSCH control information is detected, the first device obtains second frame synchronization information, and enters a synchronization state.

At step 3050, after detecting that the first device enters a synchronization state, the second device enters a synchronization state.

In an embodiment of the present disclosure, after entering the synchronization state, the method further includes that: the second device stops sending the second PSS sequence.

At this moment, the second device may determine whether the first device has entered a synchronization state by detecting state information in the first PDSCH control information periodically sent by the first device. After both the first device and the second device enter a synchronization state, the first device and the second device still periodically send S sub-frames, but the first PSS sequence and the second PSS sequence therein are set to all 0 at this moment so as to avoid interference to other systems; or the first PDSCH control information and the second PDSCH control information are sent respectively at the sending positions (third symbols of the corresponding frame structures) of the first PSS sequence and the second PSS sequence, thereby not only avoiding interference to other systems, but also enhancing the transmission capability of PDSCH control information.

The embodiments of the present disclosure also provide a computer-readable storage medium, which stores one or more programs, where the one or more programs are executable by one or more processors to implement the method as described in any one of the above.

The embodiments of the present disclosure also provide a second device, which includes a processor and a memory, where the processor is configured to execute a program stored in the memory to implement the method as described in any one of the above.

The embodiments of the present disclosure also provide a synchronization system, which includes a first device as described in any one of the above and a second device as described in any one of the above.

Figure 4:
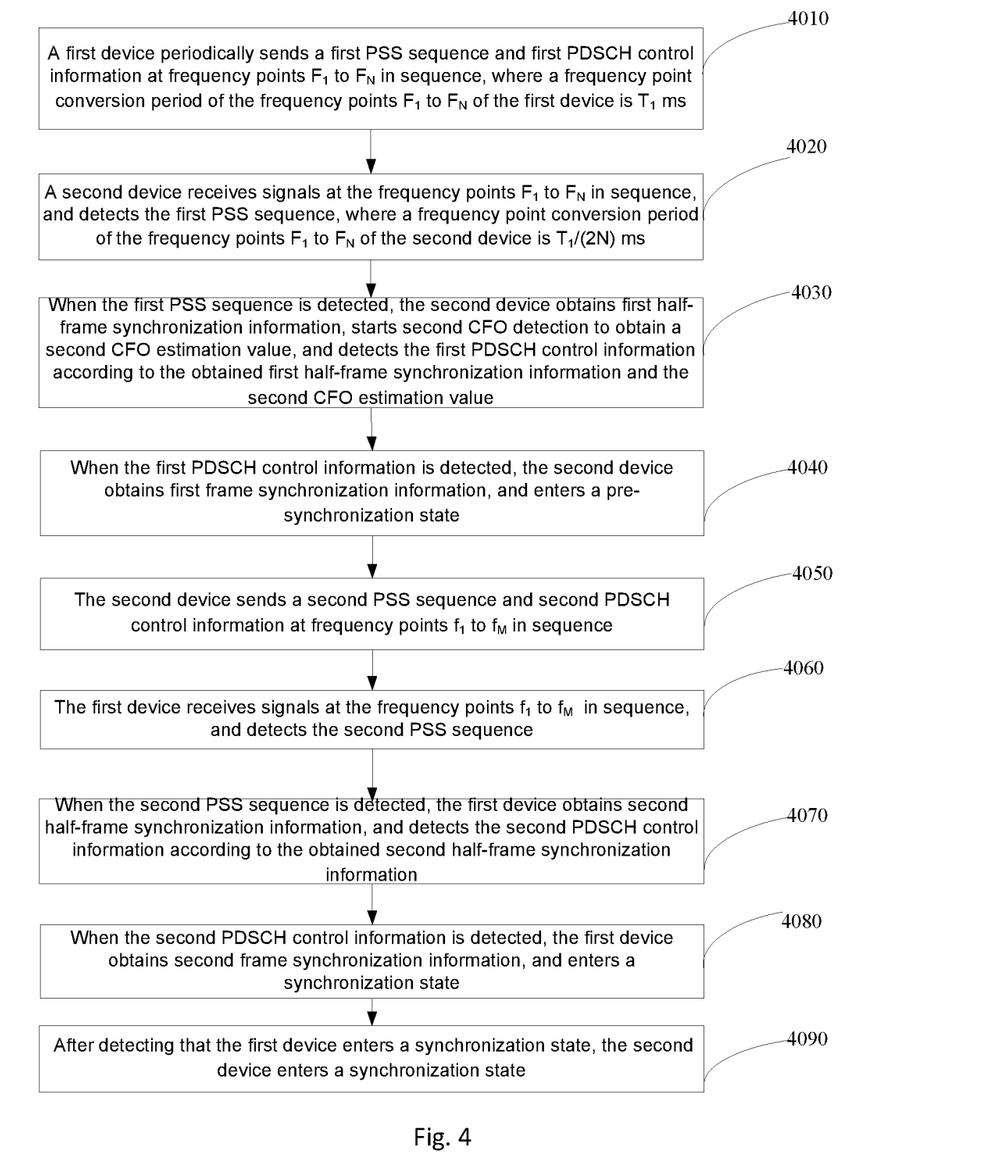
FIG. 4 is a schematic flowchart of a synchronization method of a synchronization system according to an embodiment of the present disclosure.

As shown in FIG. 4, the embodiments of the present disclosure also provide a synchronization method, which includes step 4010 to step 4090.

At step 4010, a first device periodically sends a first PSS sequence and first PDSCH control information at frequency points $F_1$ to $F_N$ in sequence, where a frequency point conversion period of the frequency points $F_1$ to $F_N$ of the first device is $T_1$ ms, the frequency points $F_1$ to $F_N$ are N different frequency points, and N is a natural number greater than or equal to 1.

In an embodiment of the present disclosure, the first device is a UAV and the second device is a remote controller; or the first device is a remote controller and the second device is a UAV.

In an embodiment of the present disclosure, adjacent frequency points among the frequency points $F_1$ to $F_N$ are uniformly spaced.

The first PDSCH control information carries information of the frequency points $f_1$ to $f_M$.

Here, the frequency points $f_1$ to $f_M$ may be the same as the frequency points $F_1$ to $F_N$, or may be different from the frequency points $F_1$ to $F_N$. In general, the UAV may receive less interference in the air, the remote controller may receive more interference on the ground, and the frequency interference can be better avoided by selecting different frequency points from the frequency points $f_1$ to $f_M$ and the frequency points $F_1$ to $F_N$.

In an embodiment of the present disclosure, the first device and the second device select frequency points $F_1$ to $F_N$ and a first PSS sequence according to a UAVID.

At step 4020, a second device receives signals at the frequency points $F_1$ to $F_N$ in sequence, and detects the first PSS sequence, where a frequency point conversion period of the frequency points $F_1$ to $F_N$ of the second device is $T_1/(2N)$ ms.

At step 4030, when the first PSS sequence is detected, the second device obtains first half-frame synchronization information, starts second CFO detection to obtain a second CFO estimation value, and detects the first PDSCH control information according to the obtained first half-frame synchronization information and the second CFO estimation value.

At step 4040, when the first PDSCH control information is detected, the second device obtains first frame synchronization information, and enters a pre-synchronization state.

In an embodiment of the present disclosure, the first frame synchronization information includes a first super-frame number and a first sub-frame number, and the first PDSCH control information carries the first super-frame number and the first sub-frame number.

At step 4050, the second device sends a second PSS sequence and second PDSCH control information at frequency points $f_1$ to $f_M$ in sequence, where the frequency points $f_1$ to $f_M$ are M different frequency points, and M is a natural number greater than or equal to 1.

At step 4060, the first device receives signals at the frequency points $f_1$ to $f_M$ in sequence, and detects the second PSS sequence.

At step 4070, when the second PSS sequence is detected, the first device obtains second half-frame synchronization information, and detects the second PDSCH control information according to the obtained second half-frame synchronization information.

At step 4080, when the second PDSCH control information is detected, the first device obtains second frame synchronization information, and enters a synchronization state.

In an embodiment of the present disclosure, the second frame synchronization information includes a second super-frame number and a second sub-frame number, and the second PDSCH control information carries the second super-frame number and the second sub-frame number.

At step 4090, after detecting that the first device enters a synchronization state, the second device enters a synchronization state.

In the present embodiment, after both the first device and the second device enter a synchronization state, the first device and the second device still periodically send S sub-frames, but the first PSS sequence and the second PSS sequence therein are set to all 0 at this moment so as to avoid interference to other systems; or the first PDSCH control information and the second PDSCH control information are sent respectively at the sending positions (third symbols of the corresponding frame structures) of the first PSS sequence and the second PSS sequence, thereby not only avoiding interference to other systems, but also enhancing the transmission capability of PDSCH control information.

Figure 5:
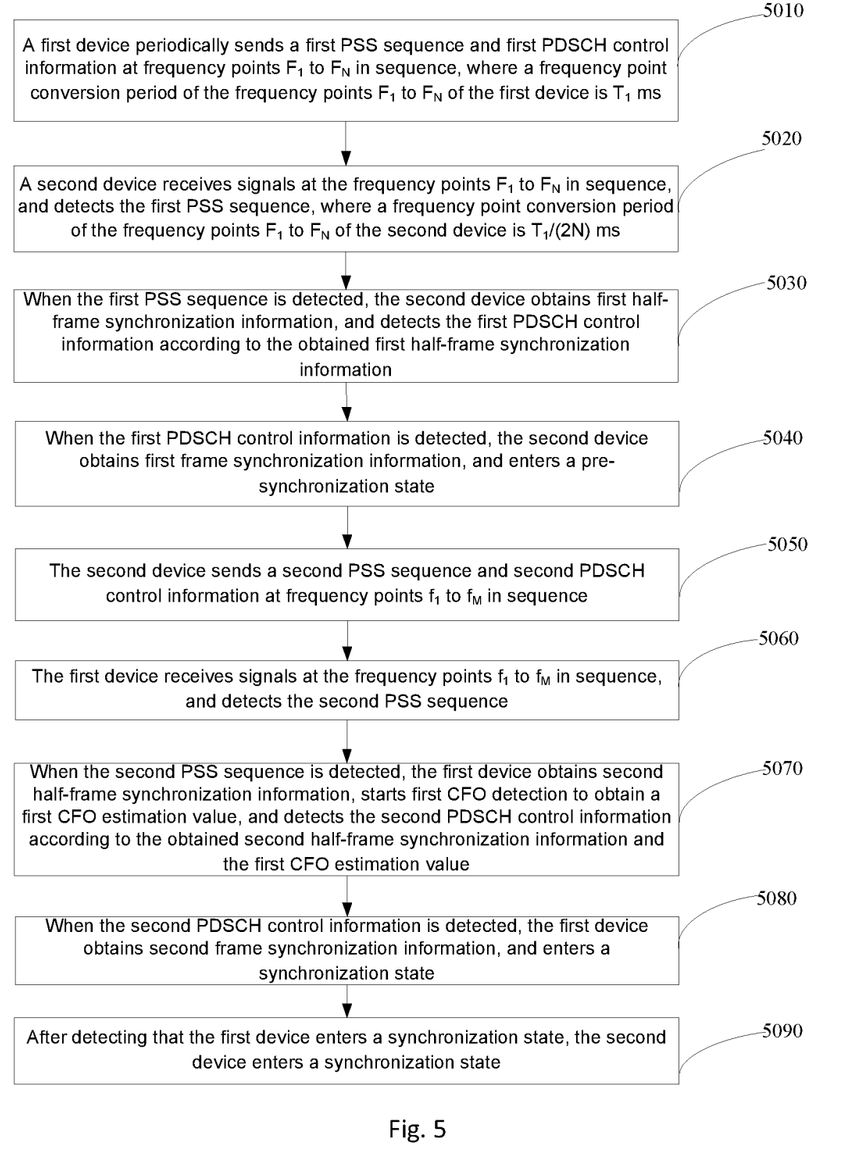
FIG. 5 is a schematic flowchart of another synchronization method of a synchronization system according to an embodiment of the present disclosure.

As shown in FIG. 5, the embodiments of the present disclosure also provide a synchronization method, which includes step 5010 to step 5090.

At step 5010, a first device periodically sends a first PSS sequence and first PDSCH control information at frequency points $F_1$ to $F_N$ in sequence, where a frequency point conversion period of the frequency points $F_1$ to $F_N$ of the first device is $T_1$ ms, the frequency points $F_1$ to $F_N$ are N different frequency points, and N is a natural number greater than or equal to 1.

In an embodiment of the present disclosure, the first device is a UAV and the second device is a remote controller; or the first device is a remote controller and the second device is a UAV.

In an embodiment of the present disclosure, adjacent frequency points among the frequency points $F_1$ to $F_N$ are uniformly spaced.

The first PDSCH control information carries information of the frequency points $f_1$ to $f_M$.

Here, the frequency points $f_1$ to $f_M$ may be the same as the frequency points $F_1$ to $F_N$, or may be different from the frequency points $F_1$ to $F_N$. In general, the UAV may receive less interference in the air, the remote controller may receive more interference on the ground, and the frequency interference can be better avoided by selecting different frequency points from the frequency points $f_1$ to $f_M$ and the frequency points $F_1$ to $F_N$.

In an embodiment of the present disclosure, the first device and the second device select frequency points $F_1$ to $F_N$ and a first PSS sequence according to a UAVID.

At step 5020, a second device receives signals at the frequency points $F_1$ to $F_N$ in sequence, and detects the first PSS sequence, where a frequency point conversion period of the frequency points $F_1$ to $F_N$ of the second device is $T_1/(2N)$ ms.

At step 5030, when the first PSS sequence is detected, the second device obtains first half-frame synchronization information, and detects the first PDSCH control information according to the obtained first half-frame synchronization information.

At step 5040, when the first PDSCH control information is detected, the second device obtains first frame synchronization information, and enters a pre-synchronization state.

In an embodiment of the present disclosure, the first frame synchronization information includes a first super-frame number and a first sub-frame number, and the first PDSCH control information carries the first super-frame number and the first sub-frame number.

At step 5050, the second device sends a second PSS sequence and second PDSCH control information at frequency points $f_1$ to $f_M$ in sequence, where the frequency points $f_1$ to $f_M$ are M different frequency points, and M is a natural number greater than or equal to 1.

At step 5060, the first device receives signals at the frequency points $f_1$ to $f_M$ in sequence, and detects the second PSS sequence.

At step 5070, when the second PSS sequence is detected, the first device obtains second half-frame synchronization information, starts first CFO detection to obtain a first CFO estimation value, and detects the second PDSCH control information according to the obtained second half-frame synchronization information and the first CFO estimation value.

At step 5080, when the second PDSCH control information is detected, the first device obtains second frame synchronization information, and enters a synchronization state.

In an embodiment of the present disclosure, the second frame synchronization information includes a second super-frame number and a second sub-frame number, and the second PDSCH control information carries the second super-frame number and the second sub-frame number.

At step 5090, after detecting that the first device enters a synchronization state, the second device enters a synchronization state.

In the present embodiment, after both the first device and the second device enter a synchronization state, the first device and the second device still periodically send S sub-frames, but the first PSS sequence and the second PSS sequence therein are set to all 0 at this moment so as to avoid interference to other systems; or the first PDSCH control information and the second PDSCH control information are sent respectively at the sending positions (third symbols of the corresponding frame structures) of the first PSS sequence and the second PSS sequence, thereby not only avoiding interference to other systems, but also enhancing the transmission capability of PDSCH control information.

For example, the first device is a UAV and the second device is a remote controller. The synchronization method provided by the embodiments of the present disclosure includes the following steps:

At step 601, the UAV sends a first PSS sequence and first PDSCH control information at frequency points $F_1$ to $F_N$ (N generally is 4 or 8) in sequence, where a frequency point conversion period is $T_1$, and $T_1$ generally is 2560 or 5120 ms. The frequency points $F_1$ to $F_N$ may be frequency points in a public free frequency band (e.g., a 2.4 GHz WIFI frequency band), the frequency points are uniformly spaced, and the selection of the frequency points is related to a UAVID.

A system frame structure is shown in FIG. 2. A 10 ms frame is divided into two 5 ms half-frames, each half-frame is composed of four data sub-frames (D sub-frames) and one special sub-frame (S sub-frames). Each sub-frame is divided into two 0.5 ms slots, each of which is further divided into seven OFDM symbols. The special sub-frame is composed of three special slots with a total time length of 1 ms: a DwPTS, a GP, and a UpPTS. The length of the three special slots supports nine configuration options. The length of the UpPTS is 1-2 symbols; the length of the DwPTS is 3-12 symbols; and the length of the corresponding GP is 1-10 symbols. The first PSS sequence sent by the UAV is sent in the third symbol of sub-frame 1 and sub-frame 6 (i.e., DwPTS).

For example, in an embodiment, N is 4, frequency points $F_1$ to $F_4$ are 2.41 GHz, 2.43 GHz, 2.45 GHz, and 2.47 GHz, respectively, and a frequency point conversion period is 2560 ms.

At step 602, the remote controller detects the first PSS sequence at the frequency points $F_1$ to $F_N$ in sequence according to the paired UAVID, where the frequency point conversion period is $T_1/(2N)$.

Since PSS signals of upper and lower half-frames of one sub-frame are the same, PSS detection can only realize a 5 ms half-frame synchronization function. The method for PSS detection is sliding correlation with a local sequence, and the position of a peak value is the position of a PSS.

Step 602 includes the following steps:

At step 6021, according to a local time of the remote controller, PSS detection on a frequency point $F_x$ is started, where X is greater than or equal to 1 and less than or equal to N, and a change period of X is $T_1/(2N)$ ms. (For example, N=4, and $T_1$=2560. At this moment, the frequency point conversion period of the frequency points $F_1$ to $F_4$ on the remote controller is 320 ms).

At step 6022, the remote controller performs step 6021 if the maximum peak value of the detected PSS is not higher than a threshold Th1 (e.g., 20).

At step 6023, the remote controller performs step 603 if the maximum peak value of the detected PSS is higher than the threshold Th1.

At step 603, when the maximum peak value of the detected first PSS sequence is higher than a preset first threshold (i.e. threshold Th1), the remote controller obtains half-frame synchronization, starts downlink CFO detection to obtain a CFO estimation value, starts first PDSCH control information detection according to the obtained half-frame synchronization information and the CFO estimation value to obtain wireless frame synchronization, and enters a pre-synchronization state.

Step 603 includes the following steps:

At step 6031, the remote controller performs step 6021 if PDSCH control information is decoded incorrectly for a continuous duration of L (L is typically 90 ms).

At step 6032, otherwise, as long as the remote controller correctly decodes the PDSCH control information once within the duration of L, the local time of the remote controller is set to be completely aligned with the local time of the UAV, the remote controller enters a pre-synchronization state, and the PDSCH control information is continuously decoded to monitor the state of the UAV.

The occurrence of a CFO may be due to a frequency offset of oscillators in a transmitter and a receiver, or a Doppler shift due to motion of the receiver, the transmitter, or both, which may result in reduced performance of a wireless communication system, thereby reducing the quality of service provided to the receiver. CFO estimation is one of the key technologies of an OFDM system, and the present disclosure does not limit which CFO estimation method is used for detection.

The UAV and the remote controller of the present disclosure use a super-frame structure to define an access time of a device to a channel. Super-frame definition can be achieved by sending beacons, one super-frame includes 1024 frames, the length of each frame is 10 ms, and therefore the length of one super-frame is 10240 ms. Each super-frame begins with a beacon that contains information such as a duration of the super-frame and the allocation of the duration. After a normal device in the network receives a beacon at the beginning of a super-frame, tasks may be assigned according to the contents therein, such as entering a sleep state until the super-frame ends.

At step 604, the remote control sends a second PSS sequence and second PDSCH control information at frequency points $f_1$ to $f_M$ (M generally is 4 or 8) in sequence, where a frequency point conversion period is $T_2$, and for example, $T_2$ may be 5 ms.

For example, in an embodiment, M is 4, frequency points $f_1$ to $f_4$ are 2.42 GHz, 2.44 GHz, 2.46 GHz, and 2.48 GHz, respectively, and a frequency point conversion period is 5 ms.

At step 605, the UAV receives signals at the frequency points $f_1$ to $f_M$ in sequence according to the local time and performs PSS detection, where the frequency point conversion period is $T_2$ (same as the frequency point conversion period in step 604).

Step 605 includes the following steps:

At step 6051, the UAV performs step 605 if the maximum peak value of the detected PSS is not higher than a threshold Th2 (e.g., 20).

At step 6052, the UAV performs step 606 if the maximum peak value of the detected PSS is higher than the threshold Th2.

At step 606, when the maximum peak value of the detected second PSS sequence is higher than a preset second threshold (i.e. threshold Th2), the UAV obtains half-frame synchronization, starts second PDSCH control information detection according to the obtained half-frame synchronization information to obtain wireless frame synchronization, and enters a synchronization state.

Step 606 includes the following steps:

At step 6061, the UAV performs step 606 if PDSCH control information is decoded incorrectly for a continuous duration of L (L is typically 90 ms).

At step 6062, otherwise, as long as the UAV correctly decodes the PDSCH control information once within the duration of L, the UAV enters a synchronization locking state, and the PDSCH control information is continuously decoded to monitor the state of the remote controller.

At step 607, after the remote controller detects that the UAV enters a synchronization state, the remote controller also enters a synchronization state.

In the process of decoding PDSCH control information by the remote controller for M duration (M generally is 500 ms), once the state of the UAV is detected to be in a synchronization locking state, the remote controller sets the state of the remote controller to be in a synchronization locking state, so that the UAV and the remote controller realize a synchronization process.

After the UAV and the remote controller enter a synchronization state, the UAV and the remote controller do not send PSS sequences any more, and third symbols of corresponding frame structures become PDSCH control information so as to enhance the transmission capability of the PDSCH control information.

According to the synchronization method and device, the synchronization system and the computer-readable storage medium provided by the embodiments of the present disclosure, a scheduling method for fast synchronization by utilizing an LTE PSS and a PDSCH can effectively resist interference and simultaneously realize fast synchronization of the UAV and the remote controller.

All or part of the steps of the above method may be performed by a program instructing related hardware, which may be stored in a computer-readable storage medium, such as a read-only memory, a magnetic disk or an optical disk. Optionally, all or part of the steps of the above embodiments may be implemented using one or more integrated circuits, and accordingly, one or more of the modules/units of the above embodiments may be implemented in hardware or in software functional modules. The present disclosure is not limited to any particular form of combination of hardware and software.

What is claimed is:

1. A synchronization method, comprising:
   periodically sending, by a first device, a first Primary Synchronization Signal (PSS) sequence and first Physical Downlink Shared Channel (PDSCH) control information at frequency points $F_1$ to $F_N$ in sequence, wherein the first PSS sequence and the first PDSCH control information are used for a second device to detect the first PSS sequence and detect the first PDSCH control information, the frequency points $F_1$ to $F_N$ are N different frequency points, and N is a natural number greater than or equal to 1;
   receiving, by the first device, signals at frequency points $f_1$ to $f_M$ in sequence, and detecting a second PSS sequence, wherein the frequency points $f_1$ to $f_M$ are M different frequency points, and M is a natural number greater than or equal to 1;
   when the second PSS sequence is detected, obtaining, by the first device, half-frame synchronization information, and detecting second PDSCH control information according to the obtained half-frame synchronization information; and
   when the second PDSCH control information is detected, obtaining, by the first device, frame synchronization information, and entering a synchronization state;
   wherein the second PSS sequence is used for the first device to detect the second PSS sequence, and the second PDSCH control information is used for the first device to detect the second PDSCH control information;
   wherein the first device is an Unmanned Aerial Vehicle (UAV) and the second device is a remote controller; or the first device is a remote controller and the second device is a UAV.

2. The method according to claim 1, wherein before detecting the second PDSCH control information, the method further comprises:
   starting, by the first device, first Carrier Frequency Offset (CFO) detection to obtain a first CFO estimation value; and
   detecting second PDSCH control information according to the obtained half-frame synchronization information comprises: detecting, by the first device, the second PDSCH control information according to the obtained half-frame synchronization information and the first CFO estimation value.

3. A first device, comprising a processor and a memory, wherein the processor is configured to execute a program stored in the memory to implement the method as claimed in claim 2.

4. The method according to claim 1, wherein adjacent frequency points among the frequency points $F_1$ to $F_N$ are uniformly spaced; and the first PDSCH control information carries information of the frequency points $f_1$ to $f_M$.

5. A first device, comprising a processor and a memory, wherein the processor is configured to execute a program stored in the memory to implement the method as claimed in claim 4.

6. The method according to claim 1, wherein the frame synchronization information comprises a super-frame number and a sub-frame number, and the second PDSCH control information carries the super-frame number and the sub-frame number.

7. A first device, comprising a processor and a memory, wherein the processor is configured to execute a program stored in the memory to implement the method as claimed in claim 6.

8. The method according to claim 1, wherein after the first device enters the synchronization state, the method further comprises: stopping, by the first device, sending the first PSS sequence.

9. A non-transitory computer-readable storage medium, storing one or more programs, wherein the one or more programs are executable by one or more processors to implement the method as claimed in claim 1.

10. A first device, comprising a processor and a non-transitory memory, wherein the processor is configured to execute a program stored in the non-transitory memory to implement the method as claimed in claim 1.

11. A synchronization system, comprising a first device as claimed in claim 10.

12. A synchronization method, comprising:
receiving, by a second device, signals at frequency points $F_1$ to $F_N$ in sequence, and detecting a first Primary Synchronization Signal (PSS) sequence, wherein the frequency points $F_1$ to $F_N$ are N different frequency points, and N is a natural number greater than or equal to 1;
when the first PSS sequence is detected, obtaining, by the second device, first half-frame synchronization information, and detecting first Physical Downlink Shared Channel (PDSCH) control information according to the obtained first half-frame synchronization information;
when the first PDSCH control information is detected, obtaining, by the second device, first frame synchronization information, and entering a pre-synchronization state;
sending, by the second device, a second PSS sequence and second PDSCH control information at frequency points $f_1$ to $f_M$ in sequence, wherein the second PSS sequence and the second PDSCH control information are used for a first device to detect the second PSS sequence and detect the second PDSCH control information, the frequency points $f_1$ to $f_M$ are M different frequency points, and M is a natural number greater than or equal to 1; and
after detecting that the first device enters a synchronization state, entering, by the second device, a synchronization state,
wherein the first PSS sequence is used for the second device to detect the first PSS sequence, and the first PDSCH control information is used for the second device to detect the first PDSCH control information;
wherein the first device is an Unmanned Aerial Vehicle (UAV) and the second device is a remote controller; or the first device is a remote controller and the second device is a UAV.

13. The method according to claim 12, wherein before detecting the first PDSCH control information, the method further comprises:
starting, by the second device, Carrier Frequency Offset (CFO) detection to obtain a CFO estimation value; and
detecting first PDSCH control information according to the obtained first half-frame synchronization information comprises: detecting, by the second device, the first PDSCH control information according to the obtained first half-frame synchronization information and the CFO estimation value.

14. The method according to claim 12, wherein a frequency point conversion period of the frequency points $F_1$ to $F_N$ of the second device is $T_1/(2N)$ ms, wherein $T_1$ is a frequency point conversion period of the frequency points $F_1$ to $F_N$ of the first device.

15. The method according to claim 12, wherein after the second device enters the synchronization state, the method further comprises: stopping, by the second device, sending the second PSS sequence.

16. A non-transitory computer-readable storage medium, storing one or more programs, wherein the one or more programs are executable by one or more processors to implement the method as claimed in claim 12.

17. A second device, comprising a processor and a non-transitory memory, wherein the processor is configured to execute a program stored in the non-transitory memory to implement the method as claimed in claim 12.

18. A synchronization method, comprising:
periodically sending, by a first device, a first Primary Synchronization Signal (PSS) sequence and first Physical Downlink Shared Channel (PDSCH) control information at frequency points $F_1$ to $F_N$ in sequence, wherein a frequency point conversion period of the frequency points $F_1$ to $F_N$ of the first device is $T_1$ ms, the frequency points $F_1$ to $F_N$ are N different frequency points, and N is a natural number greater than or equal to 1;
receiving, by a second device, signals at the frequency points $F_1$ to $F_N$ in sequence, and detecting the first PSS sequence, wherein a frequency point conversion period of the frequency points $F_1$ to $F_N$ of the second device is $T_1/(2N)$ ms;
when the first PSS sequence is detected, obtaining, by the second device, first half-frame synchronization information, starting Carrier Frequency Offset (CFO) detection to obtain a CFO estimation value, and detecting the first PDSCH control information according to the obtained first half-frame synchronization information and the CFO estimation value;
when the first PDSCH control information is detected, obtaining, by the second device, first frame synchronization information, and entering a pre-synchronization state;
sending, by the second device, a second PSS sequence and second PDSCH control information at frequency points $f_1$ to $f_M$ in sequence, wherein the frequency points $f_1$ to $f_M$ are M different frequency points, and M is a natural number greater than or equal to 1;
receiving, by the first device, signals at the frequency points $f_1$ to $f_M$ in sequence, and detecting the second PSS sequence;
when the second PSS sequence is detected, obtaining, by the first device, second half-frame synchronization information, and detecting the second PDSCH control information according to the obtained second half-frame synchronization information;
when the second PDSCH control information is detected, obtaining, by the first device, second frame synchronization information, and entering a synchronization state; and
after detecting that the first device enters a synchronization state, entering, by the second device, a synchronization state;

wherein the first device is an Unmanned Aerial Vehicle (UAV) and the second device is a remote controller; or the first device is a remote controller and the second device is a UAV.

* * * * *